2,877,032
STRADDLE MOUNTED RADIUS ROD

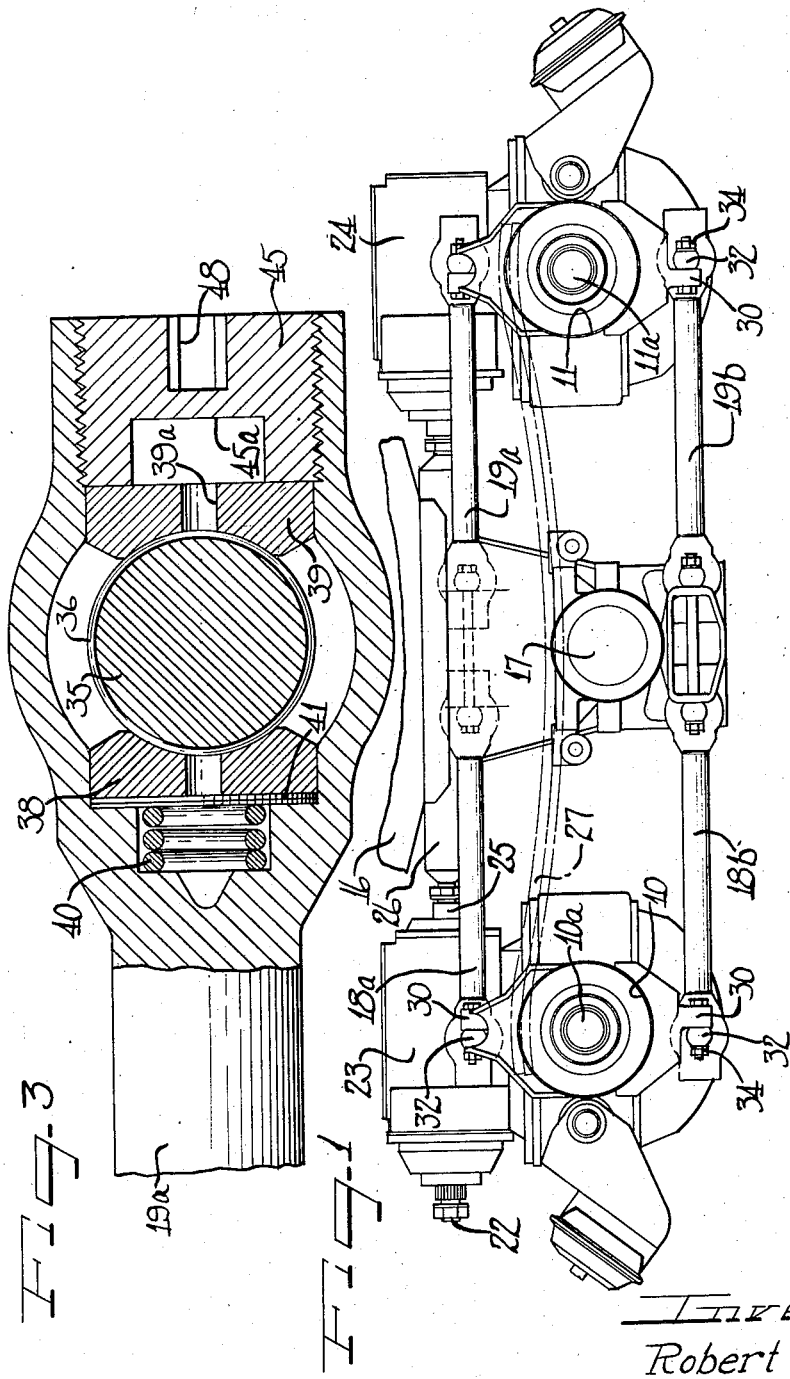

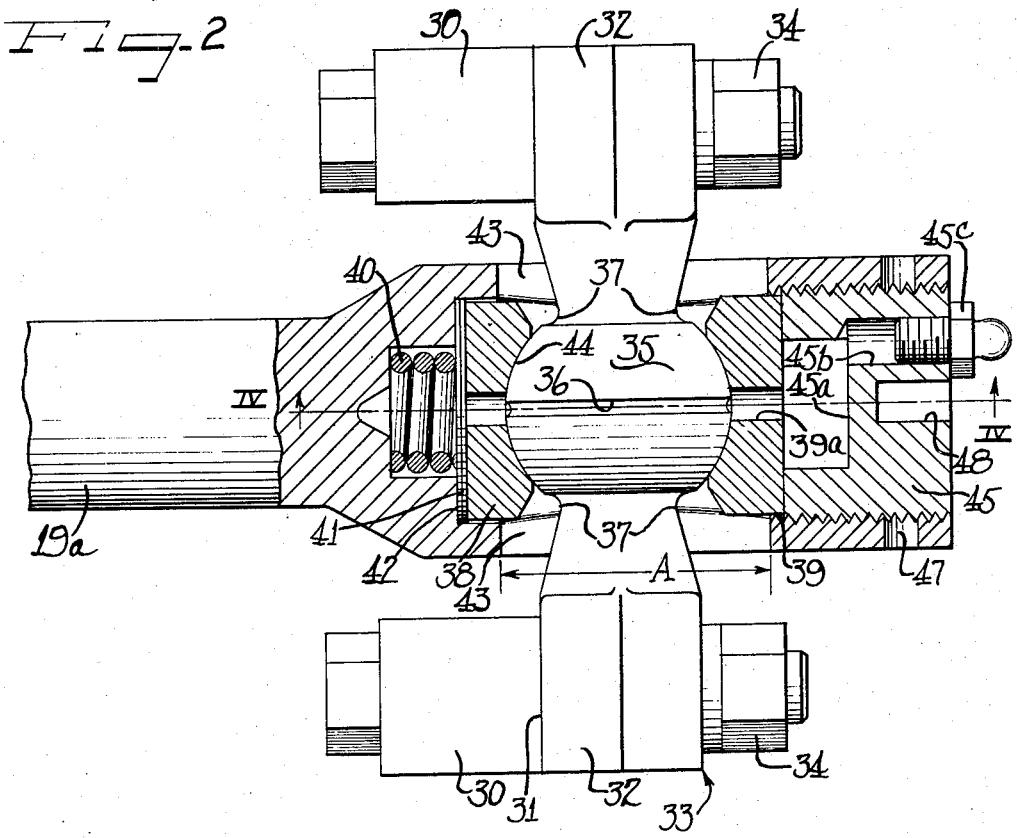
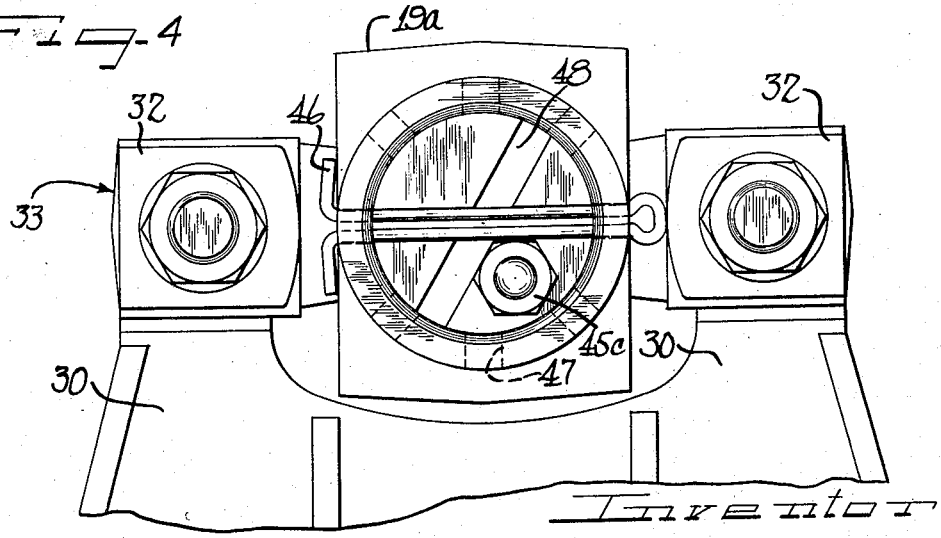

Robert E. Fidler, Rochester, Mich., assignor to Thompson Products, Inc., Cleveland, Ohio, a corporation of Ohio Application July 21, 1955, Serial No. 523,545

2 Claims. (Cl. 287—90)

The present invention relates to the running gear of tandem axle vehicles and is, more particularly, concerned with the provision of an improved heavy duty radius rod construction for trucks or the like.

As those familiar with the field of rear wheel suspension are aware, numerous linkages have been devised over the years for controlling the interrelationship between tandem mounted rear axles. One of the most successful commercial arrangements has been the structure wherein a pair of transverse rear axles have been mounted for and aft of a spring support beam and wherein the axles are secured for movement relative to the beam by means of a parallelogram linkage. This linkage has comprised a pair of radius rods extending between the spring support beam and each end of the individual axle, one of the rods being mounted generally horizontally above the beam and the axle and geared to both, and the other radius rod being secured generally horizontally below the beam and the axle and secured to both. The radius rod constructions utilized in the past have attempted to overcome simultaneously the problems of extremely heavy loads and also the need for freedom of action of the axle parts. Various types of radius rod connections have been proposed, including, for the most part, structures incorporating resilient components of some sort in the joint to prevent binding and excessive wear.

Extended use of the modern heavy duty trucks incorporating such tandem axle arrangements has shown that resiliently mounted radius rods, as well as the other prior art types, are unsatisfactory. Under repeated vibration and actuation under load the rubber in resilient connections has completely disintegrated providing a looseness at the joints which, if not destroying critical tolerances, provides a loose connection causing the wheels to track untrue under variations in driving torque and thrust. The present invention has provided an improved arrangement whereby all resiliency has been eliminated from the radius rods of a tandem axle while at the same time providing substantially complete freedom of axle movement in its desired paths. At the same time that resiliency has been eliminated, adjustment has been provided so that extremely accurate positioning of the components may be accomplished and the function of resiliency accordingly rendered completely unnecessary. In the structure of the present invention, employing individual radius rods, comprising four rods connecting each of the separate tandem axles to the spring support means, both the individual axle housing and the brake beam are provided with upstanding yoke or fork supports having a leg of the yoke positioned on each side of the individual radius rod. A ball joint is rigidly secured to the supports by means of a straddle mount passing completely through the radius rod such that the radius rod is suspended to the vehicle in such a manner as to carry the truck loads caused by driving on the tandem axles. By straddle mounting the joint, all cantilever members are eliminated from the radius rod construction and great strength is achieved.

Further, by elimination of the resilient portions of the radius rod mountings, as well as by providing the straddle mounting with a rigid universal ball positioned at the intermediate part thereof, complete freedom is provided for all of the component parts and any slack or other misalignment of the system is eliminated. It has been found that such joints are capable of withstanding the most severe usage and with slight adjustments made in the field after wear has started, the radius rod and radius rod connection may be rendered completely renewed, thereby eliminating complete replacement of these items ordinarily required in the past under worn conditions.

It is, accordingly, an object of the present invention to provide a novel and improved radius rod structure for supporting and guiding tandem axles or the like.

Still a further object of the present invention is to provide a novel and substantially improved non-resilient radius rod.

Yet another object of the present invention is to provide an axle mounting system wherein the axle guides are adjustable in effective length and are non-resilient to provide a completely restorable tandem axle linkage capable of simple adjustment in the field to maintain proper operating clearances between the axle parts.

Yet a further object of the present invention is to provide an improved radius rod mounting providing built in fore and aft adjustment of the radius rod and axle distances.

A feature of the invention is the provision of a straddle, non-resilient, radius rod mounting for heavy duty drive systems.

Another feature of the invention resides in the provision of simplified, highly effective, heavy duty, adjustment means for radius rods or the like.

Yet a further object of the present invention is to provide an extremely strong, simply assembled, radius rod structure for trucks or the like and having no resilient parts capable of deterioration from load or other conditions such as the presence of grease.

Still other and further objects and features of the present invention will at once become apparent to those skilled in the art from a consideration of the attached drawings wherein a preferred embodiment of the present invention is shown by way of illustration only, and wherein:

Figure 1 is a side elevational view of a tandem rear axle assembly utilizing the apparatus of the present invention;

Figure 2 is an enlarged view, in plan, of one end of an individual radius rod illustrating its mounting to one of the axles;

Figure 3 is a cross-sectional view taken along line IV—IV of Figure 2;

Figure 4 is an end view in elevation, enlarged, of one end of a radius rod and mounting as viewed from the right in Figure 2.

As shown on the drawings:

As may be seen from a consideration of Figure 1, a pair of tandem axles 10 and 11 rotatably supporting axle shafts 10a, 11a which in turn carry wheels (not shown), are mounted transversely of the frame 16 for vertical movement relative thereto. The axles 10 and 11 are respectively pivotally secured to an intermediate transverse axle and spring support beam 17 by means of sets of radius rods, each of which sets comprises two pairs of rods comprising, as shown in Figure 1, a top, or overhead radius rod such as 18a and 19a and a bottom or lower radius rod 18b and 19b. As a result of the parallelogram relationship provided by the radius rods positioned as shown, any of the individual wheels 12 and 13 may move vertically relative to the beam 17 but movement longitudinally of the frame 16 is prevented.

Driving torque is applied to the axle shafts 10a and 11a, separately by means of the drive shaft 22, a first gear reduction unit 23, drivingly connected to the axle shaft 10a, and a second gear reduction unit 24 drivingly connected to the rear axle shaft 11a and driven from a tail shaft 25 extending from the rear of the unit 23 and connected to the gear unit 24 through a universal stub shaft 26. As a result of the fact that pairs of radius rods are utilized, no rotation of the axles 10 and 11 may occur, and accordingly, the series driveshaft arrangement illustrated may be utilized without providing more than a nominal amount of longitudinal slip in the driveshaft connection. As will, of course, be apparent, the radius rods transfer torque applied by the driveshaft 22 to the axle shafts 10a and 11a to the vehicle frame. Accordingly, in the structure illustrated, the radius rods not only perform the function of maintaining exact clearances and relationship between the axles 10 and 11 and the frame components, but they also serve to transfer braking and pushing forces at the wheels to the vehicle frame in the manner of torque rods.

Vertical movement of the axles 10 and 11 is resisted by the longitudinal springs 27 which are secured at their mid points to the beam 17 and which straddle the axles 10 and 11 at the end of the springs to provide a downwardly acting force thereon. The ends of the springs 27, when installed as illustrated in Figure 1, are slidable relative to the axles 10 and 11 rather than being positively connected thereto so that the position of the axles is independent of change in length of the springs due to changes in the deflection thereof under load.

In accordance with the teachings of the present invention, each of the individual radius rods, such as for example 18a, is straddle mounted to its respective axle, 10, and the beam 17. This connection is more clearly evident from a consideration of Figures 2 and 4 wherein a radius rod 19a is illustrated secured to the outer surface of the axle 11 through a pair of upstanding yoke arms 30 fixedly secured to the axle, preferably by bolting, as shown, or by welding. The yoke arms 30 each provide an abutment surface 31 against which the extended arms 32 of a straddle mounted stud 33 are positioned. Bolts 34 fixedly secure the stud 33 to the yoke arms 30, and hence the axle 11. The yoke arms 30 are, in practice, constructed of sufficient height to permit the free pivotal movement of the radius rod but this height is preferably maintained at a minimum in order to prevent bending of the arms 30 toward each other. In the case where structural design of the axles or the beam 17 requires a somewhat longer pair of yoke arms at each radius rod end, a cross brace may be welded between the arms 30 to prevent their inward movement under stress.

As shown in Figures 3 and 4, the straddle mounted ball stud 33 is provided with a ball element 35 having a lubricating groove 36 therearound. The ends of the ball facing the support arms 32 are necked as at 37 to permit slight pivotal movement of the radius rod in the horizontal plane, which movement is necessary when one side only of an axle is moved upwardly. The ball 35 is seated in a pair of bearing cups 38 and 39 which are maintained in anti-rattling contact therewith by means of a heavy compression spring 40. The diameter of the ball 35 is slightly less than the dimension indicated at A in Figure 2, thereby permitting the assembly of abutment 38, with a pair of adjustment, spacer washers 41, within the cup 42 in the radius rod 19a, before positioning of the stud 33 therein. After the parts 40, 41 and 38 are positioned as shown in Figure 2, the straddle mounted stud 33 is inserted through the lateral aperture 43, is moved into the pocket 44 in the bearing cup 38 and bearing cup 39 is positioned against the ball. The closure plug 45 is then threaded into tight engagement with the bearing cup 39 and a cotter key 46 inserted through apertures 47 and one of the matching slots 48 in the plug 45. The bearing cup 39 is provided with a longitudinal bore 39a through which grease may flow from the reservoir 45a into which it is inserted from the grease channel 45b and fitting 45c. By providing the fitting 45c on the end plug 45 rather than in conventional position at the side of the rod 19a, service is rendered simpler and compactness is substantially improved. This positioning is accomplished by placing the fitting 45c off center as indicated in Figures 2 and 4 thereby performing its important function without interference with the cotter key 46 no matter what the position of the latter may be and, also, independently of the position of assembly of the respective parts 38, 39 and 45, thus eliminating any alignment problems whatever.

As a result of the inclusion of the shims 41 and the threaded plug 45, adjustment may be made at each of the radius rods to provide for perfect alignment of the axles. This alignment, once obtained, is retained constantly since no resilience or yieldability is provided in the radius rods of the present invention. While the joint provides a universal pivotal movement, and accordingly, permits all necessary movements of the axles during travel over uneven terrain, the longitudinal length of the radius rods can not vary. Further, by providing a rigid bolted connection at both ends of the straddle mounted stud 33, to rigid yoke arms 30, bending of the stud 33 is substantially impossible, even under extremely heavy loads, since such bending is resisted not only by the inherent strength of the stud 33 but also by resistance of the arms 30 to inward bending, described above. This construction is substantially stronger, therefore, than a cantilever type stud secured only at one end and which would, under heavy duty loads to which radius rods of this type are often subjected, deflect causing misalignment. Further, the straddle mounting completely prevents separation of the parts even in the event that the plug 45 should become disassembled through breakage of a cotter key. This is true, since it is impossible for the ball 35 to escape laterally completely out of the cavity 42, as could happen in cantilever mounted constructions.

It will thus be understood, that I have provided a novel, and substantially improved suspension system for heavy duty vehicles or the like, wherein non-resilient radius rods are provided for maintaining universal, but constant positioning of their respective axles. Through the elimination of resiliency and the provision of adjustability in a simple manner a much more satisfactory suspension is provided which retains its dimensional stability over periods far in excess of those heretofore evidenced in resilient systems, or systems utilizing a series of pivotal lengths subject to wear and improper functioning at the pivots.

It will, further, be apparent to those skilled in the art that variations and modifications may be made in the structure hereinabove set forth without departing from the scope of the novel concepts of the present invention. Accordingly, it is my intention that the scope of my invention be limited solely by that of the hereinafter appended claims.

I claim as my invention:

1. A rigid radius rod comprising a longitudinally extending link having a transverse aperture therethrough, a longitudinally extending bore in said link intersecting said transverse bore, a cupped, rigid segmental spherical, bearing cup rigidly secured in said longitudinal bore, a transversely extending stud positioned in said transverse bore and having a segmental spherical intermediate portion seated in said cup bearing, a second cup bearing seated against said stud, means maintaining said second cup bearing tightly against said stud, and means on the ends of said transverse stud, externally of said link for securing said stud fixedly to a support member at both sides of said link.

2. A non-elastic, universally pivotal radius rod comprising a link, a transverse aperture extending completely through said link, a bearing cup in said link, having a segmental spherical cupped surface therein facing longitudinally of said link, a straddle stud positioned transversely of said link through said aperture and having a pair of integral arms projecting on opposite sides of said link, a second bearing cup positioned in engagement with said stud, means securing said stud by its opposite ends to a fixed support, and means adjustably positioning said second bearing against said stud and said stud against said first bearing, said last named means having a grease fitting in the longitudinal end face thereof and at least one cotter key slot in said longitudinal end face, said grease fitting being positioned eccentrically of said last named means whereby grease may be introduced through said last named means without interference with said cotter key slot.

References Cited in the file of this patent

UNITED STATES PATENTS

| | | |
|---|---|---|
| 2,066,695 | Peo | Jan. 5, 1937 |
| 2,096,530 | Alden | Oct. 19, 1937 |
| 2,347,409 | Harbers | Apr. 25, 1944 |
| 2,476,664 | Humig | July 19, 1949 |
| 2,750,200 | Scheel | June 12, 1956 |
| 2,755,097 | Elconin | July 17, 1956 |